US012801976B2

(12) United States Patent
Aguilar et al.

(10) Patent No.: US 12,801,976 B2
(45) Date of Patent: Nov. 17, 2026

(54) MANAGING A MACHINE LEARNING ENVIRONMENT

(71) Applicant: Aptiv Technologies AG, Schaffhausen (CH)

(72) Inventors: Miguel A. Aguilar, Düsseldorf (DE); Paul Dragan, Dortmund (DE); Christian Prediger, Lindlar (DE)

(73) Assignee: Aptiv Technologies AG, Schaffhausen (CH)

( * ) Notice: Subject to any disclaimer, the term of this patent is extended or adjusted under 35 U.S.C. 154(b) by 1190 days.

(21) Appl. No.: 17/527,110

(22) Filed: Nov. 15, 2021

(65) Prior Publication Data

US 2022/0188704 A1 Jun. 16, 2022

(30) Foreign Application Priority Data

Dec. 15, 2020 (EP) .................................... 20214293

(51) Int. Cl.
*G06N 20/00* (2019.01)

(52) U.S. Cl.
CPC .................................... *G06N 20/00* (2019.01)

(58) Field of Classification Search
CPC .......... G06N 20/00; G06F 9/4843; G06F 9/48
See application file for complete search history.

(56) References Cited

U.S. PATENT DOCUMENTS

| | | | |
|---|---|---|---|
| 7,639,171 | B2 | 12/2009 | Alland et al. |
| 9,470,777 | B2 | 10/2016 | Arage |
| 10,303,492 | B1 | 5/2019 | Wagner et al. |
| 10,430,641 | B2 | 10/2019 | Gao |
| 11,169,798 | B1 * | 11/2021 | Palmer ................ G06F 16/9024 |
| 2015/0012204 | A1 | 1/2015 | Breuer et al. |
| 2015/0353083 | A1 | 12/2015 | Hasberg et al. |
| 2016/0116916 | A1 | 4/2016 | Pink et al. |
| 2018/0188059 | A1 | 7/2018 | Wheeler et al. |

(Continued)

FOREIGN PATENT DOCUMENTS

| | | |
|---|---|---|
| CN | 103559791 | 2/2014 |
| CN | 111401208 | 7/2020 |

(Continued)

OTHER PUBLICATIONS

"Extended European Search Report", EP Application No. 20209230.0, May 4, 2021, 10 pages.

(Continued)

*Primary Examiner* — Kamran Afshar
(74) *Attorney, Agent, or Firm* — Harness, Dickey & Pierce, P.L.C.

(57) ABSTRACT

A method and computing device are disclosed herein for managing a machine learning (ML) environment, the method comprising receiving, by a ML controller, ML model information from a ML application, the ML model information comprising a ML model definition and ML model metadata comprising information specifying a ML runtime to execute a ML model; and generating, by the ML controller, a model runner instance in an abstraction layer at the ML controller using the received ML model information, the model runner instance being configured to interact with the specified ML runtime hosted by a target ML platform to cause the ML runtime to execute the ML model.

10 Claims, 5 Drawing Sheets

(56) References Cited

U.S. PATENT DOCUMENTS

| | | | | |
|---|---|---|---|---|
| 2018/0329034 | A1 | 11/2018 | Bilik et al. | |
| 2018/0350086 | A1 | 12/2018 | Sweet et al. | |
| 2019/0042290 | A1* | 2/2019 | Bailey | G06F 9/45504 |
| 2019/0271549 | A1 | 9/2019 | Zhang et al. | |
| 2019/0286153 | A1 | 9/2019 | Rankawat et al. | |
| 2019/0340775 | A1 | 11/2019 | Lee et al. | |
| 2019/0384302 | A1 | 12/2019 | Silva et al. | |
| 2020/0250485 | A1 | 8/2020 | Nagori et al. | |
| 2020/0334544 | A1 | 10/2020 | Liu et al. | |
| 2020/0356415 | A1* | 11/2020 | Goli | G06N 20/00 |
| 2020/0372397 | A1 | 11/2020 | Lee et al. | |
| 2021/0291816 | A1 | 9/2021 | Lilja et al. | |
| 2021/0300353 | A1 | 9/2021 | Carlander et al. | |
| 2021/0331679 | A1 | 10/2021 | Lilja et al. | |
| 2021/0333380 | A1 | 10/2021 | Lilja et al. | |
| 2022/0083386 | A1* | 3/2022 | Almeida | G06N 3/0495 |
| 2024/0330773 | A1* | 10/2024 | Aguilar | G06F 9/5038 |

FOREIGN PATENT DOCUMENTS

| | | | |
|---|---|---|---|
| DE | 102009009047 | 8/2010 | |
| DE | 102009022588 | 12/2010 | |
| DE | 102016007630 | 12/2017 | |
| DE | 102017217972 | 4/2019 | |
| DE | 102017126388 | 5/2019 | |
| DE | 102019205008 | 7/2020 | |
| EP | 3454079 | 3/2019 | |
| JP | 2018138402 | 9/2018 | |
| WO | 2020140047 | 7/2020 | |
| WO | WO-2021096005 A1 * | 5/2021 | G06F 9/5027 |

OTHER PUBLICATIONS

"Extended European Search Report", EP Application No. 20211232.2, May 25, 2021, 10 pages.

"Extended European Search Report", EP Application No. 20214293.1, May 27, 2021, 10 pages.

"Extended European Search Report", EP Application No. 20164443.2, Sep. 9, 2020, 10 pages.

"Extended European Search Report", EP Application No. 20171489.6, Sep. 18, 2020, 11 pages.

"Extended European Search Report", EP Application No. 20171491.2, Sep. 28, 2020, 9 pages.

"Extended European Search Report", EP Application No. 20166617.9, Oct. 7, 2020, 7 pages.

Aihara, et al., "Free-Space Estimation for Self-Driving System Using Millimeter Wave Radar and Convolutional Neural Network", Mar. 2019, 4 pages.

Bochkovskiy, et al., "YOLOv4: Optimal Speed and Accuracy of Object Detection", Apr. 23, 2020, 17 pages.

Caltagirone, et al., "LIDAR-Camera Fusion for Road Detection Using Fully Convolutional Neural Networks", Sep. 21, 2018, 7 pages.

Casapietra, et al., "Building a Probabilistic Grid-based Road Representation from Direct and Indirect Visual Cues", Jun. 2015, 8 pages.

Chen, et al., "Progressive LiDAR Adaptation for Road Detection", Apr. 2, 2019, 11 pages.

Foroughi, et al., "Free Space Grid for Automotive Radar Sensors", Sep. 2015, pp. 249-256.

Godard, et al., "Digging Into Self-Supervised Monocular Depth Estimation", Aug. 17, 2019, 18 pages.

Guizilini, et al., "3D Packing for Self-Supervised Monocular Depth Estimation", Mar. 28, 2020, 13 pages.

Kunz, et al., "Fast Collision Checking with a Frenet Obstacle Grid for Motion Planning", Jun. 2014, pp. 95-104.

Li, et al., "High Resolution Radar-based Occupancy Grid Mapping and Free Space Detection", Mar. 2018, pp. 70-81.

Liang, et al., "PolyTransform: Deep Polygon Transformer for Instance Segmentation", Jan. 16, 2021, 10 pages.

Lyu, et al., "ChipNet: Real-Time LiDAR Processing for Drivable Region Segmentation on an FPGA", Mar. 5, 2019, 11 pages.

Maneewongvatana, et al., "It's okay to be skinny, if your friends are fat", Dec. 18, 1999, 8 pages.

Nuss, "Consistent Environmental Modeling by use of Occupancy Grid Maps, Digital Road Maps, and Multi-Object Tracking", Jun. 2014, 7 pages.

Redmon, et al., "YOLO9000: Better, Faster, Stronger", Jul. 2017, 9 pages.

Redmon, "YOLOv3: An Incremental Improvement", Apr. 8, 2018, 6 pages.

Redmon, et al., "You Only Look Once: Unified, Real-Time Object Detection", May 9, 2016, 10 pages.

Sundram, et al., "Development of a Miniature Robot for Multi-robot Occupancy Grid Mapping", Jul. 2018, 7 pages.

Suzuki, et al., "Topological Structural Analysis of Digitized Binary Images by Border Following", Apr. 1985, pp. 32-46.

Weiss, "Robust Driving Path Detection in Urban and Highway Scenarios Using a Laser Scanner and Online Occupancy Grids", Jul. 2007, pp. 184-189.

Zhao, et al., "Pyramid Scene Parsing Network", Apr. 27, 2017, 11 pages.

Zou, "Free Space Detection Based on Occupancy Gridmaps", Apr. 2012, 70 pages.

Communication pursuant to Article 94(3) EPC regarding European Patent Application No. 20214293.1, dated Feb. 28, 2025.

* cited by examiner

MANAGING A MACHINE LEARNING ENVIRONMENT

CROSS-REFERENCE TO RELATED APPLICATION

This application claims priority to European Patent Application Number 20214293.1, filed Dec. 15, 2020, the disclosure of which is hereby incorporated by reference in its entirety herein.

BACKGROUND

In recent years, machine learning (ML) algorithms have gained acceptance as a solution to solve a wide range of problems in multiple application domains. As a result, electronic devices nowadays are often required to support numerous applications that use a number of different ML models that need to be simultaneously executed on a single system.

In a first prior approach, the Android Neural Network API (NNAPI) has been developed. This is a low-level backend for running machine learning-based algorithms and applications on Android devices. NNAPI consists of a low-level declarative API for defining the machine learning algorithm structure and for describing the associated metainformation (i.e. information related to memory management, execution priority and mapping to hardware units) and a runtime system that executes the machine learning algorithms by leveraging the available hardware units through a hardware abstraction layer (HAL).

NNAPI requires the user to either re-implement the machine learning algorithm using the provided low-level API or to use a machine learning library that can leverage NNAPI. NNAPI further requires the hardware vendors to design, implement, and maintain NNAPI-specific HALs.

Another prior approach involves a machine learning compiler stack. For example, a TVM compiler stack consists of an intermediate representation (IR), a compiler frontend for converting machine learning algorithms given in external formats (e.g. Tensorflow, Protobuf, ONNX, PyTorch) to the internal TVM IR, a compiler backend for realizing IR-level optimizations and for emitting executable code, a runtime system for executing the generated code and managing memory and other resources. However, this approach requires the hardware vendors to design, implement, and maintain TVM-specific compiler backends.

SUMMARY

This specification relates to managing a machine learning environment. In accordance with a first aspect of the present disclosure, there is provided a method of managing a machine learning (ML) environment, the method comprising: receiving, by a ML controller, ML model information from a ML application, the ML model information comprising a ML model definition and ML model metadata comprising information specifying a ML runtime to execute a ML model; and generating, by the ML controller, a model runner instance in an abstraction layer at the ML controller using the received ML model information, the model runner instance being configured to interact with the specified ML runtime hosted by a target ML platform to cause the ML runtime to execute the ML model.

The method may further comprise: receiving a ML execution request from the ML application requesting execution of the ML model, the ML execution request specifying a model runner instance corresponding to the ML runtime to be used, the ML execution request further comprising input data to be input to the ML model; sending the input data from the specified model runner instance to the corresponding ML runtime for input to the ML model during execution of the ML model; receiving, by the model runner instance, output data from the corresponding ML runtime, wherein the output data has been output from the ML model; and providing the output data to the ML application.

The ML model metadata may further comprise information specifying a processing resource type for executing the ML model.

The method may further comprise: executing one or more subgraphs of the ML model to determine one or more execution time measurements for the ML model; and providing said one or more execution time measurements within the ML model metadata.

The method may further comprise monitoring system performance parameters during execution of the ML model.

The method may further comprise scheduling execution of the ML model using the monitored system performance parameters.

The ML model metadata may further comprise scheduling information for that ML model, and the method may further comprise scheduling execution of the ML model using the scheduling information.

The scheduling information may comprise at least one of a ML model priority, a memory requirement for the ML model, a memory budget of a computing device, a target framerate, and a power requirement for the ML model.

In accordance with a second aspect of the present disclosure, there is provided a computer program product comprising computer-readable instructions that, when executed by a computer, cause the computer to perform the method of the first aspect.

In accordance with a third aspect of the present disclosure, there is provided a computing device for managing a machine learning (ML) environment, the device comprising: a memory storing computer-readable instructions; and a ML controller configured to receive ML model information from a ML application, the ML model information comprising a ML model definition and ML model metadata comprising information specifying a ML runtime to execute a ML model, wherein the ML controller comprises a model runner instance generator configured to generate a model runner instance in an abstraction layer at the ML controller using the received ML model information, the model runner instance being configured to interact with the specified ML runtime hosted by a target ML platform to cause the ML runtime to execute the ML model.

The ML controller may be further configured to: receive a ML execution request from the ML application requesting execution of the ML model, the ML execution request specifying a model runner instance corresponding to the ML runtime to be used, the ML execution request further comprising input data to be input to the ML model; send the input data from the specified model runner instance to the corresponding ML runtime for input to the ML model during execution of the ML model; receive, by the model runner instance, output data from the corresponding ML runtime, wherein the output data has been output from the ML model; and provide the output data to the ML application.

The ML controller may further comprise a ML workload monitor configured to monitor one or more system performance parameters during execution of the ML model.

The ML controller may further comprise a ML workload scheduler configured to schedule execution of the ML model.

The ML workload scheduler may be configured to schedule execution of the ML model using information received from the ML workload monitor.

The ML application and the target ML platform may be embedded within the computing device.

BRIEF DESCRIPTION OF THE DRAWINGS

Example embodiments will now be described by way of example only, with reference to the accompanying drawings, in which.

DETAILED DESCRIPTION

The applicant has devised a way of managing a machine learning (ML) environment in which a complex ecosystem of ML models can be accommodated. Systems in which a high degree of heterogeneity is present, in terms of different ML frameworks (i.e. ML runtimes) and in terms of different processing resources required to execute those ML frameworks, are supported.

In order to exploit the full potential of these highly heterogenous devices, a system is required that efficiently manages the execution and usage of the ML resources. The applicant has addressed the previously described challenges by means of a runtime architecture that efficiently abstracts and orchestrates the ML resources' usage while ensuring that the ML applications meet strict timing and resource usage requirements.

The applicant has addressed the challenge of efficiently executing a full ecosystem of ML applications on highly heterogeneous embedded systems by devising a runtime architecture that: (1) abstracts the interaction with ML resources to a ML controller; (2) monitors the ML workloads being executed on the system; and 3) orchestrates the execution of the ML models on the available resources.

In particular, examples described herein allow for diverse applications that use different ML models to be supported. The approach described herein simplifies the interaction between the application and the ML framework (or runtime) from the point of view of the application since the functionality of the application programming interface (API) is abstracted to an intermediary controller that sits between the application layer and the ML runtime software.

Figure 1:
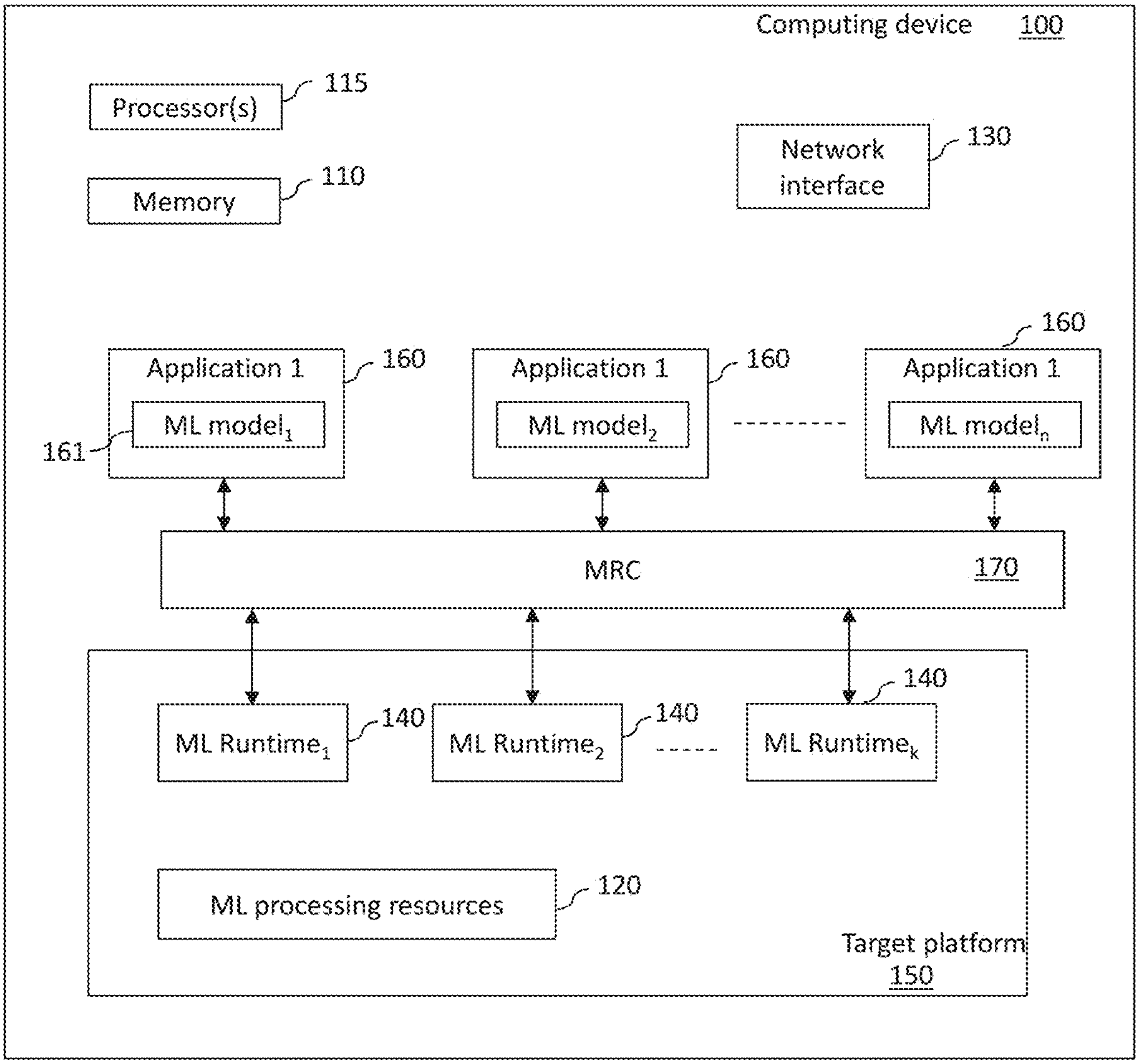
FIG. 1 is a schematic block diagram of a computing device.

FIG. 1 is a schematic block diagram illustrating components of a computing device 100 in accordance with an example of the disclosure. The computing device 100 may be any type of computing device including, for example, a desktop, a laptop, a tablet computing device, or a smartphone. The computing device 100 may be part of an automotive control system.

The computing device 100 includes a memory 110 and one or more processors 115.

The memory 110 may include one or more non-transitory computer-readable storage mediums, such as RAM, ROM, EEPROM, EPROM, flash memory devices, magnetic disks, etc., and combinations thereof. The memory 110 can store data and instructions which are executed by the processing resources 115 to cause the computing device 100 to perform operations.

The memory 110 further includes one or more buffers for the temporary storage of data by components of the computing device 100.

The computing device 100 may also include a network interface 130 that enables communication over one or more networks (e.g. the Internet).

The computing device 100 includes one or more ML runtimes 140. A ML runtime (also referred to herein as a ML framework) is software installed on the computing device 100 to implement ML functionality. The one or more ML runtimes 140 act as a software layer operable to interact with hardware such as the processing resources to execute ML models. Example ML runtimes include Tensorflow, TFLite, TVM, SNPE and TIDL. However, other ML frameworks may be implemented in addition to or as an alternative to any of these example ML frameworks. Each ML runtime is operable to execute one or more particular ML models.

Each ML runtime or framework 140 uses one or more ML processing resources 120 when executing a machine learning model as will be described in more detail hereinafter. The processing resources 120 may include one or more processing cores such as a GPU, CPU, FPGA, DSP or NPU however, other processing resources that are apparent to the skilled person may be provided in addition or as one or more alternatives to the processing resources named herein. The processor 115 and the ML processing resources 120 have been shown as separate functional elements since the processor 115 is directed towards general processing duties whilst the ML processing resources are those resources dedicated to carrying out the ML functionality described herein. Nonetheless, in some embodiments the processor 115 and ML processing resources may be integrated.

The processing resources 120 and the ML runtimes 140 together form a target platform 150.

One or more applications that utilize a machine learning model may also be installed on the computing device 100. Such applications are referred to herein as ML applications 160. Different ML applications 160 may use different ML models 161 dependent on the requirements of the ML application in question. Each particular ML model 161 may be associated with and executed by a respective ML runtime 140. The ML model may also specify a particular processing resource 120 that should be used to execute that ML model.

Where the computing device 100 is part of an automotive control system then the ML applications 160 running therein may relate to the functionality of the automotive control system such as lane guidance for driverless vehicles or monitoring of internal sensors to determine whether a driver can no longer control the vehicle.

In examples of the present disclosure, each ML application 160 interacts with a ML runtime 140 via a ML controller referred to herein as ML model runner controller (MRC) 170. As will be described in more detail hereinafter, the MRC acts as an intermediary between the ML runtime 140 and the ML application 160.

The direct interaction between the ML runtime 140 and the ML application 160 that, in the prior art, would be provided by an application programming interface (API) of the ML application 160 is instead provided by the MRC 170 which provides an intermediary abstraction layer between the application and the ML runtime. As such, the programming of ML applications is simplified since it is not necessary to provide an API between the ML application 160 and the ML runtime 140 which is to execute the ML model on behalf of the ML application 160.

Figure 2:
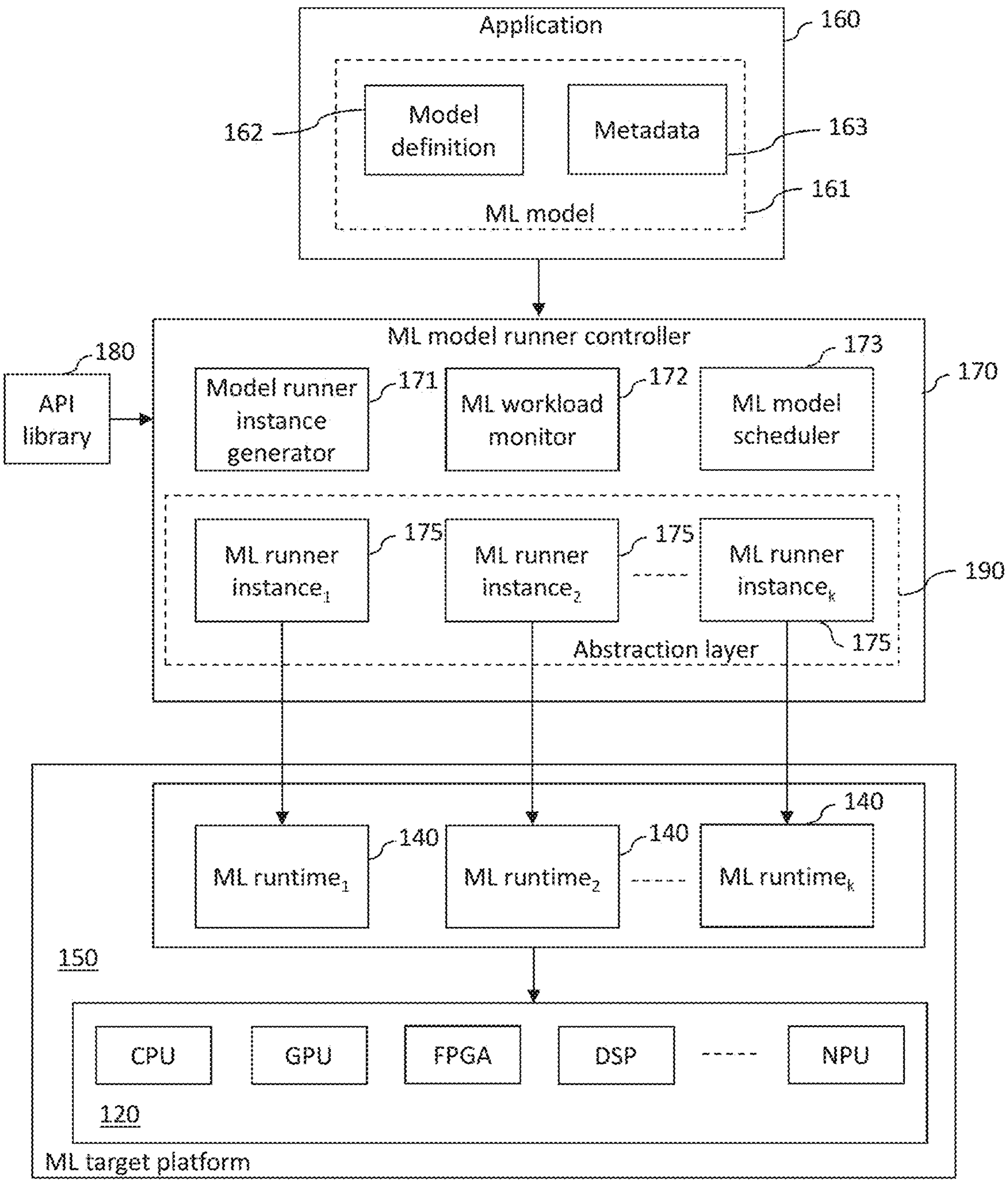
FIG. 2 is a schematic block diagram illustrating further details of the computing device.

FIG. 2 is a schematic block diagram showing components of the computing device 100 in more detail.

The MRC 170 is operable to receive input from one or multiple ML applications 160. Each ML application may include one or more ML models 161.

The ML model 161 includes a model definition 162 which may the take the form of a graph definition file which contains the model architecture and the parameters (i.e. trained weights).

In addition, the ML model 161 includes metadata 163 which provides relevant information to the MRC 170 to enable generation of ML runner instances and subsequent execution of the ML model 161. The metadata 163 includes but is not limited to the following details about the ML model 161:

The path to the model definition file;

The name of the specific ML runtime to be used to execute the ML model;

The processor core type on which the ML model is to be executed;

Profiling information of the ML model for one or multiple processor core types;

Memory requirements of the ML model, i.e., memory for the model parameters and runtime memory;

The priority of the ML model; and

Power or energy requirements of the ML model.

The MRC 170 includes core modules including a model runner instance generator 171, a ML workload monitor 172 and a ML model scheduler 173.

The model runner instance generator 171 is configured to create a model runner instance 175 to interact with the ML runtime 140 specified by the ML application 160. The model runner instance generator 171 can access one or more centralized API libraries 180 which contain API information for the ML runtime specified by the ML application 160. The API libraries 180 may be stored in the memory 110 of the device 100. An API library may be provided for each of the supported ML runtimes 140. The model runner instance 175 acts as an interface between the application 160 and the ML runtime 140. The model runner instance 175 occupies an API abstraction layer 190 situated at the MRC 170.

Using the API information, it is possible for the ML runner instance 175 to interact with the ML runtime 140 in accordance with the API for that ML runtime. In other words, the runner instance 175 acts as an interface between the application 160 and the ML runtime 140.

This arrangement is beneficial because the coding of the ML application is simplified since management of compliance with the ML runtime API is abstracted to the MRC 170. This is because the ML application only needs to provide generic input buffers for buffering the input and output data as well as specifying the model definition with its metadata. The runner instance is created at the MRC 170 using this received information and information obtained from the centralized one or more API libraries.

This is in contrast to prior art approaches where a ML runtime interacts directly with the ML application in accordance with the API of the runtime 140. In prior systems, the application has to be programmed to use the ML runtime API, increasing programming complexity.

The ML workload monitor 172 is a module responsible for keeping track of the hardware platform resource usage by the ML models. The monitoring performed by the ML workload monitor 172 may involve monitoring the usage of execution cores (ML processing resources 120) and/or memory usage. Other system parameters may also be monitored, for example power or bandwidth consumption. However, it should be understood that any system parameter indicating resource usage by the system may be monitored. The information obtained by the ML workload monitor 172 may be output to the ML model scheduler 173 to aid in scheduling decisions. Furthermore, the information may be output to a user via a user interface (not shown) so that developers can understand the workloads being deployed.

The ML model scheduler 173 is a module responsible for orchestrating the platform resource usage by the ML models 161. Scheduling decisions taken by the ML model scheduler 173 may be based on the metadata 163 of the ML models 161 provided by the ML application 160 to the MRC 170. Examples of metadata used when making scheduling decisions include, among others, profiling information, memory requirements, model priority, power requirements etc. As will be described in more detail hereinafter, scheduling usage of processing resources by different ML applications and ML models is important when multiple ML applications require ML models to be executed simultaneously. As stated above, the ML model scheduler may also schedule execution of the ML model using information received from the ML workload monitor.

There can be as many ML runner instances as required by the applications 160 running on the computing device 100 as long as a memory budget allows for it. As such, the ML workload monitor 172 is configured to keep track of the current memory usage. If the memory budget is fully used, the ML model scheduler 173 may deallocate an existing runner instance (e.g. a runner instance that is idle or that has a lower priority) to accommodate other runner instances.

In some embodiments, legacy ML applications 160 may interact directly with a ML runtime 140 instead of interacting with the ML runtime via the runner instances 175 in the abstraction layer 190 of the MRC 170. In this case the application accesses the API of the ML runtime 140 using a suitable prior art approach. However, in this case the ML application 160 may be configured to report to the MRC 170, by means of an appropriate API, when the ML model starts and ends its execution on a given core. In this way, the MRC 170 is still aware of the execution and resource usage of those ML models so that the ML model scheduler 173 can make appropriate scheduling decisions.

As mentioned above, the MRC 170 is configured to target highly heterogenous platforms 150 with multiple ML runtimes and execution core types. In general, the MRC 170 and its abstraction layer 190 allow ML applications 160 to work with any ML runtime 140 including open source (such as but not limited to Tensorflow, TFLite, TVM) or proprietary solutions (such as but not limited to SNPE from Qualcomm or TIDL from Texas Instruments). The mentioned open source and proprietary ML runtimes are just examples and the embodiments provide interfaces with ML runtimes in a generic way by means of the abstraction layer 190. In other words, the system is not bound to any specific ML runtime system. In terms of processing cores, the MRC 170 is not limited to specific types. Processing resources including a CPU, GPU, DSP, FPGA, and/or NPU or other core types may be targeted by the MRC 170.

The relevant information used by the ML model scheduler 173 MRC 170 in order to create scheduling decisions may be collected before creating the final runtime environment including multiple runner instances. Multiple types of static code analysis and profiling steps may be undertaken in order to create model metadata which includes typical execution time of particular network parts, executed on one or more ML runtimes.

Static Information Creation

When a ML model is executed performance information may be obtained therefrom and analyzed by the ML workload monitor 172 and the ML model scheduler 173. Memory requirement information about each node in a ML model may be analyzed during compile time within its ML runtime ecosystem. The ML runtime 140 may list the locally needed peak memory, consisting of all relevant memory used during runtime, and by input and output buffers, as well as parameters (e.g. weights) per node. This information may then be output to the MRC 170. Subsequently, this information may be denoted in a list as a preparation for scheduling decisions at runtime and exported within the metadata 163 when runner instances are created.

Profiling Information Creation

In order to have realistic execution times for scheduling decisions available before execution, empirically collected information may be obtained. The creation of this information will now be explained. Before a ML model is executed, a benchmarking process may take place in which an automatic routine executes, in isolation, subgraphs of the entire ML model, which can be as small as single operators, on all relevant target ML runtimes 140. Furthermore, execution benchmarks of the complete graph may be carried out and the results collected. In addition, the initialization time may be measured.

The execution time measurements may be combined together with additional information, e.g. pre-calculation of mean runtimes, worst-case and best-case runtimes, in a list and exported to the metadata 163.

Interfaces

Between the MRC 170 and user-level ML applications 160, on one hand, and between the MRC 170 and the target platform 150, on the other hand, respective interfaces are provided.

To communicate with the MRC 170, each user-level ML application 160 uses a respective MRC interface. The MRC interface is implemented by the MRC 170. To generate a ML runner instance, the following interaction occurs between the ML application 160 and the MRC 170.

ML Runner Instance Generation

Figure 3:
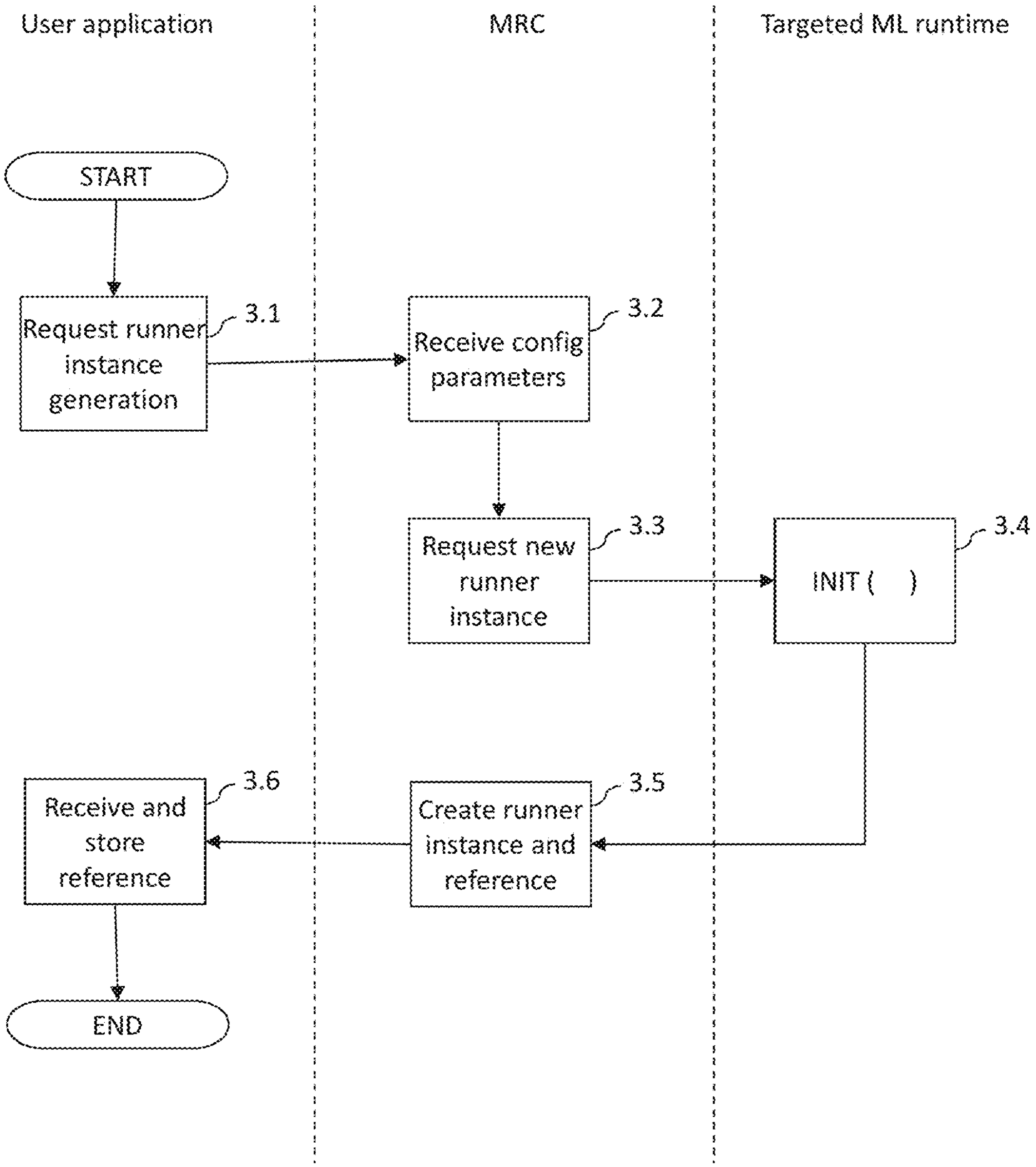
FIG. 3 is a flow chart illustrating example operations performed during generation of a machine learning runner instance.

This process is illustrated in the flow chart of FIG. 3.

A runner instance generation request is made at step 3.1 by the user-level application 160 which passes to the MRC 170 the configuration parameters of the desired runner instance. As stated above, the configuration parameters may be specified by the metadata 163. The MRC 170 receives the configuration parameters at step 3.2.

Based on these parameters, the MRC 170 can send a request to the ML runtime 140, at step 3.3, requesting the creation of the runner instance 175. The request may contain parameters obtained from the metadata such as ML model definition or expected memory usage.

However, metadata used for scheduling need not be sent to the ML runtime 140 since scheduling is managed at the MRC 170. The request to initialize the runner instance 175 is received at the ML runtime 140 at step 3.4. If the request is successful and the ML runtime 140 permits the creation of the runner instance at the MRC 170 then, at step 3.5, a runner instance 175 is created in the abstraction layer 190 of the MRC 170 by the model runner instance generator 171. A corresponding runner instance reference is also created by the MRC 170. The runner instance reference is then sent to the ML application 160 for storage at step 3.6.

ML Model Execution

Figure 4:
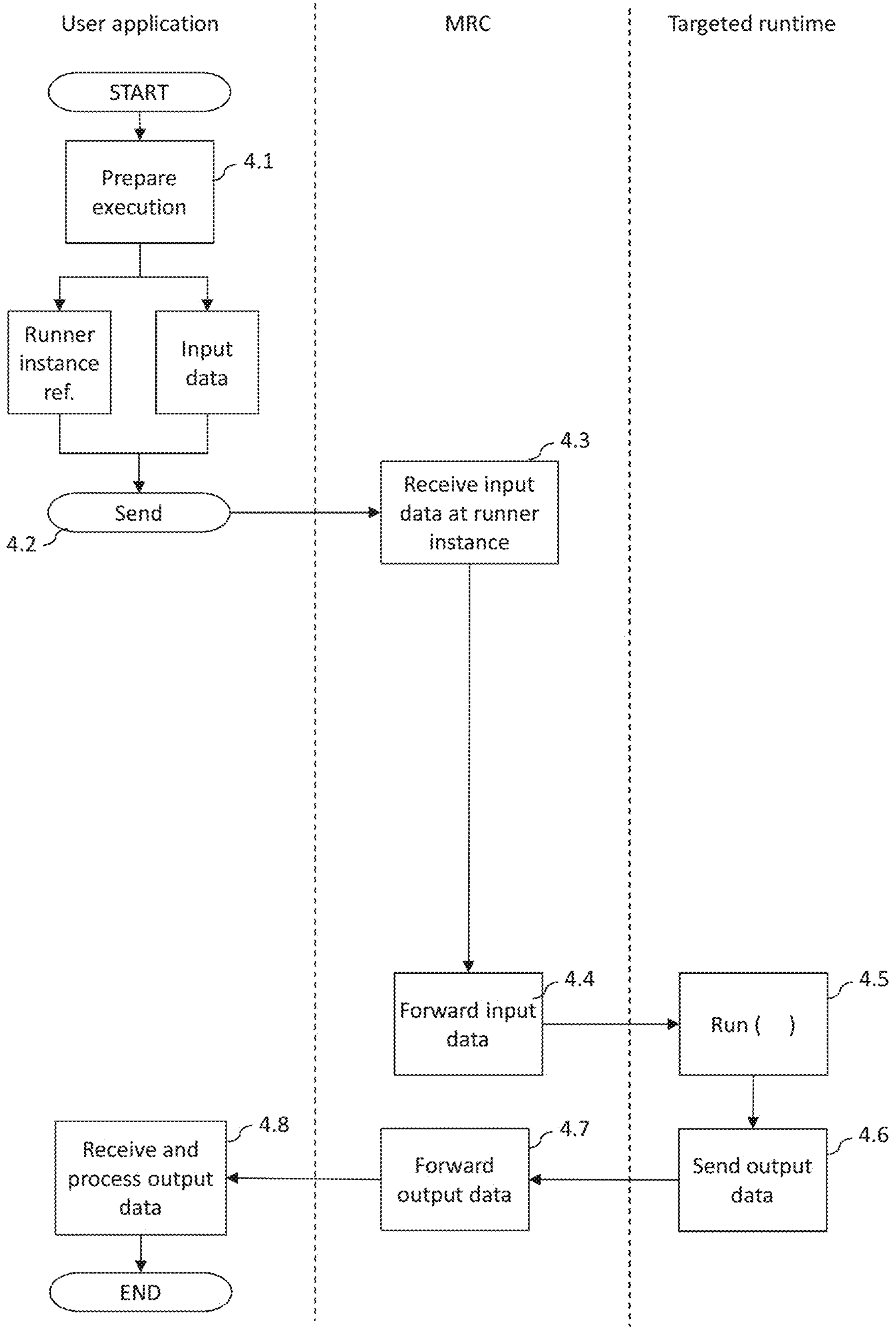
FIG. 4 is a flow chart illustrating example operations performed during execution of a machine learning model.

The user-level application 160 which initiated the registration of a runner instance 175 can subsequently request the processing of input data into a ML model specifying the runner instance to be used. This process is illustrated in the flow chart of FIG. 4.

The user-level ML application 160 can send a request to the MRC 170 for the execution of a ML model by the ML runtime 140 which may be accessed via the runner instance 175.

The process begins in response to the ML application 160 determining that a ML model is to be executed by a ML runtime 140. At step 4.1, the ML application 160 prepares for execution of the ML model by obtaining the runner reference that was created in the above described registration process. Additionally, the ML application 160 obtains input data to be input into the ML model. This information is sent to the MRC 170 at step 4.2. At step 4.3, the runner instance 175 corresponding to the runner reference receives the input data from the ML application 160.

The input data for the ML model is forwarded to the targeted ML runtime 140 at step 4.4 by the runner instance 175. The targeted ML runtime 140 executes the ML model at step 4.5 using the processing resource specified for that runner instance. The execution of the ML model by the ML runtime is performed in accordance with the rules of the ML model as well as any general rules of the ML runtime itself.

The performance of steps 4.4 and 4.5 may be controlled by the ML model scheduler 173 so that the timing of the execution of the ML model is in accordance with rules defined by one or more scheduling algorithms. Furthermore, the ML workload monitor 172 may monitor the computing resources that are used when executing the ML model.

The ML runtime 140 provides output data from the executed ML model to the MRC 170 at step 4.6. At step 4.7, the output data is then forwarded by the MRC 170 to the ML application 160.

The runner instance 175 may remain active and await further input data from the ML application 160 or may be de-initialized by the ML scheduler 173. At step 4.8, the ML application 160 processes the received output data in accordance with the requirements of the application.

ML Workload Monitor

It is advantageous for MRC 170 to understand the resource usage of the target platform 150 by the various ML models being executed, for example in terms of execution time, processing core usage, memory requirements and power consumption among other details. This information may be collected by the ML Workload Monitor 172 during the execution of a ML model. This information may be provided to the ML model scheduler 173 to make effective scheduling decisions. This is advantageous where multiple ML applications seek to execute respective ML models simultaneously.

Furthermore, information obtained by the ML Workload Monitor 172 may be output via user interface (not shown) since it is helpful for developers to better understand the behavior and requirements of the workloads being deployed. In this way, informed design decisions can be made about how and where to deploy and optimize ML models on the target system.

Figure 5:
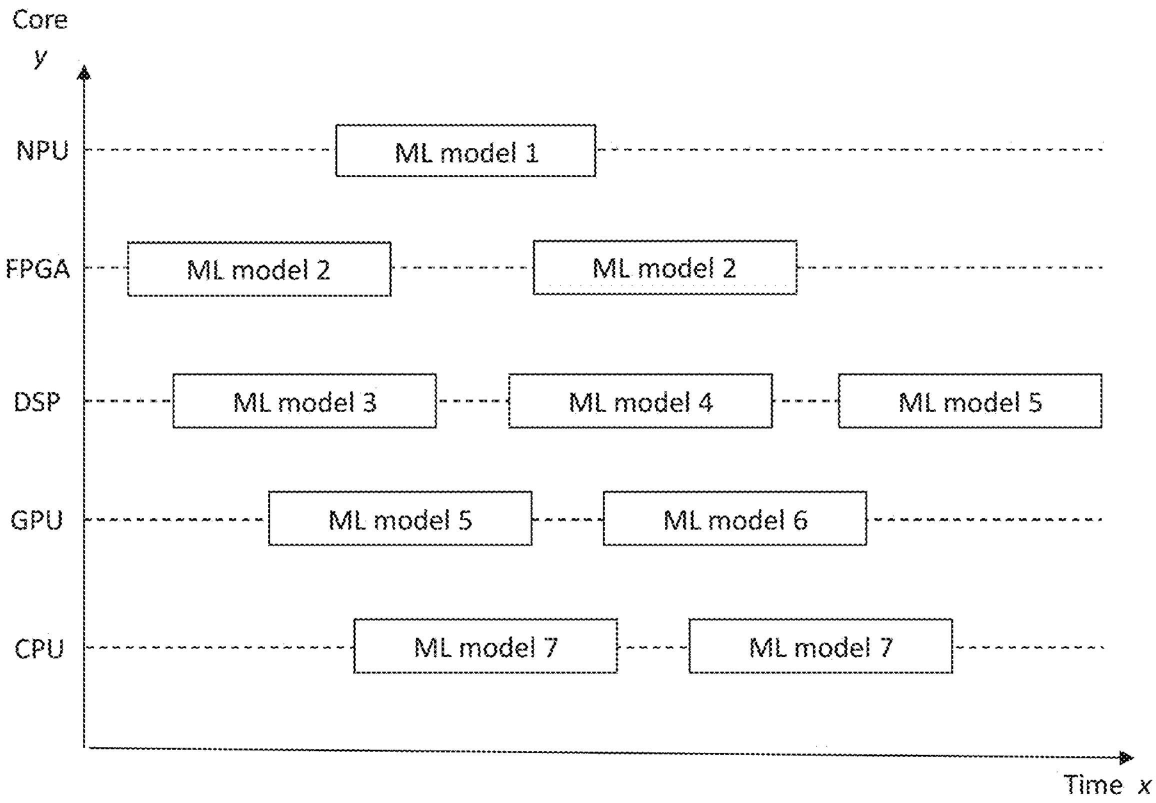
FIG. 5 is a chart illustrating allocation of processing resources.

The ML Workload Monitor 172 can provide textual and visual reports of the resource usage in a convenient way for developers. For example, a Gantt Chart can be generated, as shown in FIG. 5. This Gantt Chart has displayed on they axis the core types on which the ML models are executed and, on the x-axis is the timeline. The execution of a particular ML model on a given core is depicted as a box in the Gantt Chart. This graph helps to visualize the time frames in which models run on a given core, as well as which models run in parallel. Such a chart may be displayed to the user via a display device (not shown).

The information displayed in the chart of FIG. 6 may be output to the ML Model Scheduler 173 so that scheduling decisions can be taken automatically using one or more scheduling algorithms.

ML Model Scheduler

The ML Model Scheduler 173 of the MRC 170 may use the metadata received from the ML application 160 to decide when ML models should be executed. The ML model scheduler 173 can support both static and dynamic scheduling scenarios. The scheduling decisions may be based on various goals such as but not limited to model priority, memory budget of the system, target framerate or performance to be achieved, power consumption, among others. Therefore, in the MRC 170 it is possible to provide multiple scheduling algorithms according to the requirements of the system. These features make the ML model scheduler 173 flexible and extensible.

As mentioned earlier, if a memory budget is fully used, the ML model scheduler 173 may deallocate an existing runner instance (e.g. a runner instance that is idle or that has a lower priority) to accommodate other runner instances. As such, multiple ML applications can be accommodated simultaneously, and resources can be managed according to respective priorities and operating conditions of the computing device 100.

As mentioned earlier, where a legacy application triggers a ML model by interacting directly with a ML runtime, i.e. without the use of a runner instance, the application may still report this execution to the MRC 170 via a given API call. In this way, the execution of all models can be monitored and orchestrated whether executed via the MRC 170 or directly between the application 160 and the ML runtime 140.

From the foregoing description several benefits and advantages of examples of the disclosure will be apparent to the skilled person:

- The MRC works at a level of abstraction that allows targeting of highly heterogenous platforms with multiple ML runtimes and execution core types.
- Examples described herein enable a high portability of ML applications by abstracting away the API implementation details of the specific ML runtimes from the application to the MRC.
- The MRC monitors the ML resource usage in terms of execution cores and memory requirements and other system parameters such as (but not limited to) bandwidth or power consumption. This is useful during the development phase to better understand the ML workloads being deployed. Moreover, this information is key for the ML scheduler module to take the best resource management decisions.
- Multiple scheduling schemes can be enabled in the MRC using as an input the metainformation of the models including but not limited to priority, profiling information, memory requirements, and power consumption, among others.
- The application code size becomes lighter since the specifics of the ML runtime APIs is abstracted in a shared library accessible by the MRC.
- The MRC allows a straightforward integration of different applications (provided by different application suppliers) with different ML runtimes provided by different ML runtime suppliers.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized in ways other than those shown in the accompanying figures.

Software embodiments of the examples presented herein may be provided as, a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nano systems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the example embodiments described herein. Such software may include without limitation device drivers, operating systems, and user applications. Ultimately, such computer-readable media or storage device(s) further include software for performing example aspects of the disclosure, as described above.

Included in the programming and/or software of the system are software modules for implementing the procedures described herein. In some example embodiments herein, a module includes software, although in other example embodiments herein, a module includes hardware, or a combination of hardware and software.

While various example embodiments of the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments but should be defined only in accordance with the following descriptions and Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that any procedures recited in the claims need not be performed in the order presented.

While this specification contains many specific embodiment details, these should not be construed as limitations on the scope of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments and embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements, and features discussed only in connection with one embodiment are not intended to be excluded from a similar role in other embodiments.

The apparatuses described herein may be embodied in other specific forms without departing from the characteristics thereof. The foregoing embodiments are illustrative rather than limiting of the described systems and methods. Scope of the apparatuses described herein is thus indicated by the foregoing description, the appended claims, and changes that come within the meaning and range of equivalence thereof are embraced therein.

What is claimed is:

1. A method comprising:

managing, by a machine learning (ML) controller, a ML environment by:

executing one or more subgraphs of a ML model to determine one or more execution time measurements for the ML model;

providing the one or more execution time measurements within ML model metadata;

receiving, by the ML controller, ML model information from a ML application, the ML model information comprising a ML model definition and the ML model metadata comprising information specifying a ML runtime to execute the ML model;

generating, by a model runner instance generator of the ML controller, a model runner instance in an abstraction layer at the ML controller using the received ML model information and application programming interface (API) information for the specified ML runtime accessed by the model runner instance generator from a centralized API library, the model runner instance being configured to interact with the specified ML runtime hosted by a target ML platform to cause the ML runtime to execute the ML model;

scheduling, by a ML workload scheduler of the ML controller, execution of the ML model;

monitoring, by a ML workload monitor of the ML controller, one or more system performance parameters during execution of the ML model;

receiving, by the ML controller from a legacy ML application that interacts directly with a ML runtime, reporting indicating when the legacy ML application starts and ends its execution; and scheduling, by the ML workload scheduler of the ML controller, execution of the ML model using the one or more monitored system performance parameters and the reporting from the legacy ML application.

2. The method of claim 1, further comprising:

receiving a ML execution request from the ML application requesting execution of the ML model, the ML execution request specifying a model runner instance corresponding to the ML runtime to be used, the ML execution request further comprising input data to be input to the ML model;

sending the input data from the specified model runner instance to the corresponding ML runtime for input to the ML model during execution of the ML model;

receiving, by the model runner instance, output data from the corresponding ML runtime, wherein the output data has been output from the ML model; and providing the output data to the ML application.

3. The method of claim 1, wherein the ML model metadata further comprises information specifying a processing resource type for executing the ML model.

4. The method of claim 1, wherein the ML model metadata further comprises scheduling information for that ML model, and wherein the method further comprises scheduling execution of the ML model using the scheduling information.

5. The method of claim 4, wherein the scheduling information comprises at least one of a ML model priority, a memory requirement for the ML model, a memory budget of a computing device, a target framerate, or a power requirement for the ML model.

6. A computer-readable storage medium comprising instructions that, when executed by a computer, cause the computer to manage a machine learning (ML) environment by causing a ML controller to:

execute one or more subgraphs of a ML model to determine one or more execution time measurements for the ML model;

provide the one or more execution time measurements within ML model metadata;

receive ML model information from a ML application, the ML model information comprising a ML model definition and the ML model metadata comprising information specifying a ML runtime to execute the ML model;

generate a model runner instance in an abstraction layer at the ML controller using the received ML model information and application programming interface (API) information for the specified ML runtime accessed from a centralized API library, the model runner instance being configured to interact with the specified ML runtime hosted by a target ML platform to cause the ML runtime to execute the ML model;

schedule execution of the ML model;

monitor one or more system performance parameters during execution of the ML model;

receive, from a legacy ML application that interacts directly with a ML runtime, reporting indicating when the legacy ML application starts and ends its execution; and scheduling execution of the ML model using the one or more monitored system performance parameters and the reporting from the legacy ML application.

7. The computer-readable storage medium of claim 6, wherein the instructions, when executed, further cause the computer to manage the ML environment by causing the ML controller to:

receive, from the ML application, a ML execution request requesting execution of the ML model, the ML execution request specifying a model runner instance corresponding to the ML runtime to be used, the ML execution request further comprising input data to be input to the ML model;

send the input data from the specified model runner instance to the corresponding ML runtime for input to the ML model during execution of the ML model;

receive, by the model runner instance, output data from the corresponding ML runtime, wherein the output data has been output from the ML model; and provide the output data to the ML application.

8. The computer-readable storage medium of claim 6, wherein the ML model metadata further comprises information specifying a processing resource type for executing the ML model.

9. The computer-readable storage medium of claim 6, wherein the instructions, when executed, further cause the computer to manage the ML environment by causing the ML controller to:

execute one or more subgraphs of the ML model to determine one or more execution time measurements for the ML model; and provide said one or more execution time measurements within the ML model metadata.

10. The computer-readable storage medium of claim 6, wherein the ML model metadata further comprises scheduling information for that ML model, wherein the instructions, when executed, cause the computer to manage the ML environment by causing the ML controller to schedule execution of the ML model using the scheduling information, and wherein the scheduling information comprises at least one of a ML model priority, a memory requirement for the ML model, a memory budget of a computing device, a target framerate, or a power requirement for the ML model.

* * * * *